(12) United States Patent
Youssef et al.

(10) Patent No.: US 10,352,959 B2
(45) Date of Patent: Jul. 16, 2019

(54) METHOD AND SYSTEM FOR ESTIMATING A PATH OF A MOBILE ELEMENT OR BODY

(75) Inventors: Joe Youssef, Grenoble (FR); Christelle Godin, Brignoud (FR); Suzanne Lesecq, Froges (FR)

(73) Assignee: MOVEA, Grenoble (FR)

( * ) Notice: Subject to any disclaimer, the term of this patent is extended or adjusted under 35 U.S.C. 154(b) by 754 days.

(21) Appl. No.: 13/991,018

(22) PCT Filed: Dec. 1, 2011

(86) PCT No.: PCT/FR2011/052840
§ 371 (c)(1),
(2), (4) Date: Aug. 23, 2013

(87) PCT Pub. No.: WO2012/072957
PCT Pub. Date: Jun. 7, 2012

(65) Prior Publication Data
US 2013/0338961 A1    Dec. 19, 2013

(30) Foreign Application Priority Data

Dec. 1, 2010 (FR) ...................................... 10 59965
Dec. 1, 2010 (FR) ...................................... 10 59966

(51) Int. Cl.
*G01P 15/08* (2006.01)
*G01C 21/00* (2006.01)
*G01C 21/20* (2006.01)

(52) U.S. Cl.
CPC ........ *G01P 15/0891* (2013.01); *G01C 21/005* (2013.01); *G01C 21/206* (2013.01)

(58) Field of Classification Search
CPC .......................... G01P 15/0891; G01C 21/206; G01C 21/005
See application file for complete search history.

(56) References Cited

U.S. PATENT DOCUMENTS 7,860,676 B2 * 12/2010 Sheng .................. H04N 5/4403
                                                      702/104
2002/0161499 A1 * 10/2002 Radamis ................ B62D 5/003
                                                      701/41
(Continued)

OTHER PUBLICATIONS

Dejnabadi, H. et al., "Estimation and Visualization of Sagittal Kinematics of Lower Limbs Orientation Using Body-Fixed Sensors," IEEE Transactions on Biomedical Engineering, vol. 53, No. 7, pp. 1385 to 1393, (Jul. 2006), XP002475932.

(Continued)

*Primary Examiner* — Mohamed Charioui
*Assistant Examiner* — Jeremy A Delozier
(74) *Attorney, Agent, or Firm* — Oblon, McClelland, Maier & Neustadt, L.L.P.

(57) ABSTRACT

A method for estimating a path of a moving element or body using a sensor assembly includes: receiving acceleration values provided by an accelerometer; receiving angular velocity values provided by a gyrometer; processing the values provided for estimating at least one angular position value using the angular velocity values and at least two Cartesian position values defining a path of the moving element or body using acceleration values and the at least one previously estimated angular position value; estimating rotation parameters, by inverting a rotational realignment model of the estimated path subject to prior knowledge of the path; retroactively correcting the at least one estimated angular position value, by applying a rotation on this value using estimated rotation parameters, so as to provide at least one corrected angular position value.

15 Claims, 6 Drawing Sheets

(56) References Cited

U.S. PATENT DOCUMENTS

2005/0234644 A1   10/2005  Lin
2011/0181505 A1*  7/2011  Tseng .................... G06F 3/0346
                                                                  345/157

OTHER PUBLICATIONS

Kim, A. et al., "A Quaternion-Based Orientation Estimation Algorithm Using an Inertial Measurement Unit," Position Location and Navigation Symposium, 2004. PLANS 2004, IEEE Xplore, pp. 268 to 272, (Apr. 26, 2004), XP010768757.
Gul, F. et al., "GPS/SINS Navigation Data Fusion Using Quaternion Model and Unscented Kalman Filter," Proceedings of the 2006 IEEE International Conference on Mechatronics and Automation, pp. 1854 to 1859, (Jun. 25-28, 2006) XP 031027063.
Friedland, B., "Analysis Strapdown Navigation Using Quaternions," IEEE Transactions on Aerospace and Electronic Systems, vol. AES-14, No. 5, pp. 764 to 768, (Sep. 1, 1978) XP011166474.
International Search Report dated Feb. 3, 2012 in PCT/FR11/52840 Filed Dec. 1, 2011.

* cited by examiner

METHOD AND SYSTEM FOR ESTIMATING A PATH OF A MOBILE ELEMENT OR BODY

The invention relates to a system for estimating a path of a mobile element or body comprising a sensor assembly comprising an accelerometer and gyrometer which are rigidly connected.

The path of an element is a set of successive Cartesian positions Position_C of the element.

The invention particularly relates to estimating this path or orientation in the context of pedestrian navigation. This field is currently subject to rapid growth, with at least one international conference fully devoted to the field of navigation and positioning inside buildings (International Conference on Indoor Positioning and Indoor Navigation—IPIN, articles published in IEEE Xplore).

The invention is placed in a context with two measuring methods, i.e. accelerometers and gyrometers (AG).

Without an external system for determining the North direction or a magnetometer for measuring the Earth's magnetic field, it is not possible to ensure that the reference frame is the "North Frame", which is a fixed frame in the Earth's frame of reference. This frame is used during the entire movement (walking or running). It is considered to be the reference frame: orientations (angular position) and positions (Cartesian position) are measured in relation to this frame.

The North frame is defined by the origin $O_{NF}$ thereof and axes ($x_{NF}$, $y_{NF}$, $z_{NF}$) thereof, which converge with the axes of the Earth's frame in the East, North and vertically upward directions. The origin $O_{NF}$ thereof may consist of the point where the movement starts or any other point.

Consequently, in this part, reference will be made to the navigation frame NF, which is associated with the North frame by a constant rotation about the vertical axis. Hereinafter in the description, the navigation frame NF is used as the reference frame, and the measurements given in this navigation frame NF have an exponent n.

The path travelled by the sensor assembly EC may be retrieved by means of double integration of the natural acceleration $a_p^n$ in three dimensions or 3D in the navigation frame NF.

Let BF be a frame associated with the sensor. Hereinafter, the vectors expressed in this frame have an exponent b. The accelerometer measurements are given in the frame BF and the gravity is superposed on the natural acceleration $a_p^g$.

Therefore, before performing the double integration, it is necessary to express measurements in the frame NF and compensate for gravity.

To convert from the frame NF to the frame BF, a conversion formula is required. This formula can be obtained if the orientation of the sensor is known. In the AG context, the orientation is obtained by integrating the gyrometer measurement. However, this integration gives rise to a drift which the present invention proposes to limit.

In literature, the orientation drift is generally expressed as an orientation error of the local frame BF in relation to the frame NF. In this case, an error or drift in the estimated orientation can be considered to rotate the data of the local frame BF, not towards the navigation frame NF, but towards another navigation frame NF' affected by the drift and defined hereinafter in the description.

The frame NF', affected by the drift is defined by the orientation thereof in relation to the navigation frame or fixed global frame associated with the Earth's frame of reference NF. This orientation of NF' in relation to NF is associated with the drift of the orientation estimated by integrating the gyrometer. In this way, the orientation of the frame NF' in relation to the NF drifts slowly over time. The measurements given in this frame NF' have an exponent n'.

If the orientation of the frame NF is represented in the frame NF' by a quaternion $q_{n'n}$, the orientation of the frame NF in the frame BF by a quaternion $q_{bn}$, the orientation of the frame NF' in the frame BF by a quaternion $q_{bn'}$, the following equation is expressed as follows:

$$q_{bn}(t) = q_{bn'}(t) \otimes q_{n'n}(t),$$

wherein the sign $\otimes$ is the sign of the product associated with the quaternions.

In a conventional approach, it is possible to estimate the path of a user's ankle on the basis of the inertial data measured by the accelerometer and gyrometer.

In this case (in relation to the ankle), the gait cycle can be separated into two phases: the "SWing phase" (SW) during which the foot moves, and that during which the foot is on the ground (referred to as the "STance phase" (ST)). One step consists of the sequence of two ST and SW phases and the gait is characterised by a sequence of steps.

The term $[t_1^\kappa, t_2^\kappa]$ denotes the time interval of the SW phase for the kth step detected. To limit the Cartesian position drift which is introduced by the double integration of the acceleration, the latter is only integrated during the SW foot movement phase, whereas the velocity is set to zero during the ST phase. This adjustment requires the precise detection of the two phases to determine whether a user's foot is moving or not.

The velocity of a pedestrian's ankle can be calculated step by step (after performing a detection step), whereas the orientation or angular position Position_A is determined at each time index l with the quaternion $q_{bn}^{(l)}$ (defining the orientation of the global frame NF in the local frame BF) calculated on the basis of angular velocity measurements $\omega^{b(l)} = [\omega_x^{b(l)} \ \omega_y^{b(l)} \ \omega_z^{b(l)}]^T$ and the previous orientation quaternion $q_{bn}^{(l-1)}$ as in the equation $q_{bn}^{(l)} = q_{-\omega}^{b(l-1)} \otimes q_{bn}^{(l-1)}$ Once the orientation in the local frame BF has been determined, the accelerometer measurements are merely rotated in the global frame NF, by means of the equation $a^{n(l)} = R_{nb}^{(l)} a^{b(l)}$ wherein $R_{nb}^{(l)}$ is the rotation matrix associated with the quaternion $q_{nb}^{(l)}$ as defined by:

$$R_{bn} = \begin{bmatrix} 2q_{bn,0}^2 - 1 + 2q_{bn,1}^2 & 2q_{bn,1}q_{bn,2} - 2q_{bn,0}q_{bn,3} & 2q_{bn,1}q_{bn,3} + 2q_{bn,0}q_{bn,2} \\ 2q_{bn,1}q_{bn,2} + 2q_{bn,0}q_{bn,3} & 2q_{bn,0}^2 - 1 + 2q_{bn,2}^2 & 2q_{bn,2}q_{bn,3} - 2q_{bn,0}q_{bn,1} \\ 2q_{bn,1}q_{bn,3} - 2q_{bn,0}q_{bn,2} & 2q_{bn,2}q_{bn,3} + 2q_{bn,0}q_{bn,1} & 2q_{bn,0}^2 - 1 + 2q_{bn,3}^2 \end{bmatrix}$$

Where the quaternion $q_{nb}$ is the conjugate of $q_{bn}$ and the matrix $R_{bn}$ is the inverse transformation matrix of $R_{nb}$.

When the accelerometer measurement in the frame NF $a^n$ has been calculated, the gravity should be compensated to calculate the natural acceleration:

$$a_p^n = a^n + g^n.$$

In fact, the angular position quaternion $q_{bn}^{(l)}$ drifts in relation to the "true" value thereof due to the drift and noise of the measurements of the gyrometer G. Furthermore, the angular position quaternion $q_{bn}^{(l)}$m obtained by means of the equation $q_{bn}^{(l)}=f_q(q_{bn}^{(l-1)}, \omega^{b(l-1)})=q_{-\omega}^{b(l-1)} \otimes q_{bn}^{(l-1)}$, requires knowledge of the initial conditions. In this way, the natural acceleration is corrupted due to the drift caused by integration of the gyrometer to obtain the orientation.

The measurements of the accelerometer and thus even the natural acceleration $a_p^n$ are altered by noise and in some cases by an offset.

Even if the natural calculation is calculated with a "perfect" angular position quaternion $q_{bn}^{(l)}$, the double integration of this offset and this noise gives rise to errors on the estimated position and on the velocity.

Furthermore, due to the drift of the quaternion $q_{bn}^{(l)}$, the compensated gravitational field is not equal to $g''=[0\ 0\ -1]^T$ since it is not in the global frame NF, but in the frame NF'.

The subject of navigation and positioning in buildings, i.e. indoors, is a conventional problem encountered in literature. In 2010, a conference fully devoted to indoor navigation positioning was set up (IPIN for "International Conference on Indoor Positioning and Indoor Navigation", IEEE). Of the articles presented, nine relate to foot-mounted pedestrian navigation. A summary of these papers and further papers is given hereinafter.

A first article, "A High Precision Reference Data Set for Pedestrian Navigation using Foot-Mounted Inertial Sensors", by Michael Angermann, Patrick Robertson, Thomas Kemptner, and Mohammed Khider, IPIN conference, Zurich, 2010, describes a data acquisition method based on an optical reference system and a foot-mounted inertial measurement unit, the problem of estimating the path not being discussed.

A second article, "Evaluation of Zero-Velocity Detectors for Foot-Mounted Inertial Navigation Systems", by Isaac Skog, John-Olof Nilsson, and Peter Händel, IPIN conference, Zurich, 2010, examines the problem of detecting zero velocity movement phases for a foot-mounted inertial system ("zero velocity detectors for a foot-mounted inertial sensor based pedestrian navigation system"). Four zero velocity detection techniques are compared based on position error. The problem of position drift induced by measurement offsets and drifts is not discussed.

A third article, "Comparison and Evaluation of Acceleration Based Step Length Estimators for Handheld Devices", by Jasper Jahn, Jochen Seitz, Lucile Patino-Studencka, Ulrich Batzer, and Javier Gutiérrez Boronat, IPIN conference, Zurich, 2010, compares a number of techniques for estimating pedestrian step length based on accelerometer measurements, without discussing the problems of drift and realignment.

A fourth article, "An improved shoe-mounted inertial navigation system", by Nadir Castaneda and Sylvie Lamy-Perbal, IPIN conference, Zurich, 2010, relates to an enhanced pedestrian tracking system using an inertial sensor mounted on a user's shoe. The system implements a procedure for detecting the "STance phase" based on fuzzy logic. An indirect Kalman filter IKF is installed (the status is not estimated directly, but an error on the status, as in a fifth article, "Pedestrian Inertial Navigation with Gait Phase Detection Assisted Zero Velocity Updating Young Soo Suh, Sangkyung Park", 4th International Conference on Autonomous Robots and Agents, Feb. 10-12, 2009, Wellington, New Zealand, where the indirect Kalman filter IKF is provided for pedestrian navigation, with this article involving inertial/magnetic sensors and force sensors positioned on the tip of the shoe and under the shoe, respectively). The composition of the inertial system is not explicitly described, and a Kalman filter is installed.

A sixth article, "Context-Adaptive Algorithms to Improve Indoor Positioning with Inertial Sensors", by Ulrich Walder, Thomas Bernoulli, Gerald Glanzer, and Thomas Wießflecker, IPIN conference, Zurich, 2010, observes that the positioning precision for inertial indoor pedestrian navigation systems (mounted on the body) is poor if merely double integration of the accelerations is installed. Two enhancements are provided in respect of zero velocity phase detection and the use of a card to realign the path or reduce drift.

A seventh article, "Dual IMU Indoor Navigation with Particle Filter based Map-Matching on a Smartphone", by C. Ascher, C. Kessler, M. Wankerl, G. F. Trommer, IPIN conference, Zurich, 2010, relates to indoor navigation with realignment on an on-board map in a smartphone. Two low-cost inertial measurement units, an electronic compass and an altimeter, are used. A particle filter is installed to merge the data. Zero velocity phase detection is installed. A SLAM algorithm (Simultaneous Localisation And Mapping) is used, even if locally, the sensors for building the map may not be available.

In an eighth article, "Design choices, filter parameter tuning, and calibration of zero-velocity update aided inertial navigation systems for pedestrian navigation", by John-Olof Nilsson, Isaac Skog, and Peter Händel, IPIN conference, Zurich, 2010, the problem of designing an inertial navigation system with zero velocity phase detection (ZUPT or "Zero velocity update") is discussed. The system uses an extended Kalman filter (EKF) and ZUPT detection. The authors look at the design choices (sensor positioning, specifications) and the parameters to adjust for the Kalman filter. The results on the mean position error are good in relation to those usually encountered in the literature.

A ninth article, "Pedestrian Indoor Navigation by aiding a Foot-mounted IMU with RFID Signal Strength Measurements", by Antonio R. Jiménez, Fernando Seco, J. Carlos Prieto and Jorge Guevara, IPIN conference, Zurich, 2010, involves an inertial measurement unit mounted on a pedestrian's foot and RFID tags. Zero velocity phase detection is used and a reverse Kalman filter is installed to compensate for errors in position, velocity and posture or angular position. The technique installed is valid for various types of movement (side, rear, walking, running) and does not require any calibration phase except the gait line or the radio signal attenuation in the environment. Heading drift is reduced due to the use of magnetometers.

A tenth article, "On the use of foot-mounted INS, UWB-ranging and opportunistic cooperation in high-accuracy indoor positioning systems", by Peter StrOmbeck, Jouni Rantakokko, and Erika Emilsson, IPIN conference, Zurich, 2010, couples an inertial system and ultra-wideband radio (IR-UWB) to reduce position errors. The system used for positioning is thus richer and more complex than a basic device comprising an accelerometer and a gyrometer.

An eleventh article, "A GPS/INS-based architecture for rescue team monitoring" by Alberto Croci, Mattia De Agostino, and Ambrogio Manzino, IPIN conference, Zurich, 2010 relates to an installation of a combined satellite/inertial navigation system: the inertial system is used for counting steps and measuring the duration of a step, the magnetometer and the gyrometer being used for estimating the direction of movement. GPS data are used to correct the bias (in position) when they are sufficiently reliable.

Further articles, such as a twelfth article, "Towards Real-Time Camera Egomotion Estimation and Three-Dimensional Scene Acquisition from Monocular Image Streams", by Aufderheide and Werner Krybus, IPIN conference, Zurich, 2010, use visual systems for compensating for the drift introduced by the double integration of natural acceleration, or systems with an alternating external magnetic field as described in a thirteenth article, "Position Estimation Using Artificial Generated Magnetic Fields", by Jörg Blankenbach and Abdelmoumen Norrdine, IPIN conference, Zurich, 2010.

To summarise the thirteen articles above, either they involve an additional system in relation to the inertial system (including map, GPS, UWB) to compensate for the drift in position, or they install a Kalman filter (IKF, EKF), or they explicitly process measurements provided by magnetometers.

The document FR 2 918 745 relates to a personal navigation assistance device comprising at least one computer comprising, in memory, a digitised map of the location wherein the subject's path is envisaged, a man-machine interface, a sensor assembly borne by the subject and providing information on the subject's movements. The sensor assembly comprises an inertial system for example. The sensors borne by the user are for example accelerometers, magnetometers, gyrometers, and barometers. A calculation of the path to be travelled is for example updated according to identified intermediate targets of the path reached, these targets being referenced on the digitised map. In this case, the drift is realigned at the intermediate targets. The device according to the present invention does not require a map of the location. Likewise, it does not require "manual realignment" in relation to the identified intermediate passage points.

The document US20070018890 relates to an internal and external navigation device. The portable (pedestrian navigation) version merges data supplied by a plurality of sensors, GPS, pedometers and/or generated using accelerometers with two measurement axes, and a digital compass. Sensors are positioned on a guide-dog's back. Internal positioning is performed using the wireless connections already available in numerous environments due to the existence of WiFi networks. Fusion is performed within the scope of the Dempster-Shafer theory. The system does not use gyrometers.

The document EP1488197 combines a GPS device and a "Dead Reckoning Unit", wherein the navigation system is intended for the partially sighted. In the embodiment proposed, the system also contains a digital camera for image capture. A digitised map of the environment is also used. The Dead Reckoning Unit (DRU) contains an accelerometer, a gyrometer and a microcontroller; it takes over following GPS signal losses or to enhance the precision of the positioning obtained by the GPS. The DRU is suitable for estimating the distance travelled and the change of direction, coupling the information with a digitised map even in the event of GPS signal loss. It is possible to position the user. The distance is estimated based on the number of steps completed and the average step length. The user's relative direction is estimated using a gyroscope, since it is not sensitive to magnetic interference and is precise. The authors point out that further sensors suitable for estimating the distance travelled and the relative change of direction may be used and that their device is not restricted to the use of an accelerometer and a magnetometer. The gyroscope output is integrated to give the angle which is encoded, for example presented on four bits, giving 16 possible values of the angle, and a resolution of 22.5°. The problem in respect of the drift introduced by incorporating the gyrometer is not discussed, probably due to the use of a device incorporating a high-precision gyroscope.

The U.S. Pat. No. 6,323,807 describes an indoor navigation system with "passive" sensors. A first statistical model is constructed using measurements made at known points. A second statistical model is obtained using measurements at unknown points. The computer determines the probability of an unknown Cartesian position actually corresponding to a known position. The sensors include a triaxial accelerometer, a triaxial magnetometer, a brightness detector and a temperature sensor. It is also possible to add a low-resolution camera, a hygrometry sensor, a gyroscope for measuring the inclination, a gas detector and an altimeter. The system requires a training phase, with characteristic extraction. It is then comparable to a classification system.

A fourteenth article "Gait Assessment in Parkinson's Disease: Toward an Ambulatory System for Long-Term Monitoring Arash Salarian", by Heike Russmann, Francois J. G. Vingerhoets, Catherine Dehollain, Yves Blanc, Pierre R. Burkhard, and Kamiar Aminian, IEEE Transactions, Biomedical Engineering, Vol. 51(8), pp. 1434-1443, 2004, particularly discloses a system for measuring the rotational speed of some segments of the human body using gyroscopes, for Parkinson's patients. The problem of gyrometric measurement drift is addressed by means of high-pass filtering prior to any processing. The present invention does not require such a high-pass filtering pre-processing phase. Furthermore, the present invention uses accelerometers, not described in the article.

A fifteenth article, Estimation and Visualization of Sagittal Kinematics of Lower Limbs Orientation Using Body-Fixed Sensors by Hooman Dejnabadi, Brigitte M. Jolles, Emilio Casanova, Pascal Fua, Kamiar Aminian, IEEE Transactions On Biomedical Engineering, Vol. 53(7), pp. 1385-1393, JULY 2006, discloses a gyroscope and an accelerometer with two measurement axes used for estimating the orientation of a leg (the sensor is mounted on the tibia). The fusion of the data from these sensors uses a walking model and biomechanical constraints. The data processing method is completely different to that in the present invention. Indeed, the proposed approach requires precise positioning on the sensor on the user's tibia, which is not the case in the present invention. The authors account for the bias present in the gyrometric measurements. The angle of the tibia in relation to the horizontal when the foot is stationary is obtained directly on the basis of the measurements provided by the biaxial accelerometer. On the basis of the measurements obtained on the tibia, the corresponding measurements to be measured on the ankle are calculated. The estimation of the bias on the angle introduced into the calculation of the angle by integrating the measurement provided by the gyroscope involves low-pass filtering by a second-order Butterworth filter applied to the angle obtained by means of integration at the times when this angle is not precisely known. Then, piecewise cubic hermite interpolation is applied at the known times to obtain an estimation of the angle drift without overflow or oscillation, while retaining the monotonicity properties thereof. The estimated angle drift is then subtracted from the angle obtained by integration to obtain an estimation of the angle without drift.

A sixteenth article, "A practical gait analysis system using gyroscopes", by Kaiyu Tong and Malcolm H. Granat, Medical Engineering & Physics, Vol 21, p 87-94, 1999, relates to gait analysis using gyrometers. A single-axis gyrometer is placed on a user's tibia, near the ankle. The inclination of the tibia is obtained by integrating the measurements supplied by the gyroscope. The initial bias of the gyrometer is obtained by calculating the mean value of the signal output by the gyrometer when the user is at rest, over a five-second time window. Hypotheses on a particular orientation of the segments of the leg at a particular point of the step, i.e. the mid-stance phase, are suitable for resetting the angle to zero, cancelling out the angle drift at the end of the step. A further method tested consists of applying high-pass filtering on the tibia inclination signals to limit drift and remove the offset. This article focuses on angle estimation and not on estimating the path. In this way, the angle drift correction does not account for the drift on the path.

A seventeenth article, "Three dimensional inertial sensing of foot movements for automatic tuning of a two-channel implantable drop-foot stimulator" by P. H. Veltink, P. Slycke, J. Hemssems, R. Buschman, G. Bultstra, and H. Hermens, Medical Engineering & Physics, Vol. 25, p 21-28, 2003, relates to three-dimensional foot movements with a view to implanting a stimulator. The Cartesian position and orientation or angular position of the foot are estimated on the basis of triaxial accelerometric or magnetometric measurements. The measurements provided by the gyrometers are integrated to determine the orientation, and the position is obtained by means of double integration of the accelerations with reference to the inertial frame. It is disclosed that these integration phases may give rise to an incorrect result for the estimation of the orientation and the position due to indeterminate offsets and poorly estimated gains. It is also disclosed that, for the gait of a human being, particular initial and final conditions may be taken into account, for example, a foot placed flat on the ground, an identical upright position at the start and end of a step. Furthermore, the integration time is limited, for the duration of one step. The proposed approach for estimating the foot position and orientation in three dimensions is as follows: the orientation of the sensor on the foot is determined initially, during a static phase during which the subject is not moving. This is suitable for measuring the gravitational field in the sensor frame. A step detection algorithm is suitable for defining the start and end of a step. At the end of each step, the angular velocity measurement is integrated and the drift is compensated using conditions on the angle at the start and end of the step. The orientation obtained, as a function to time, is then used to express the acceleration in the inertial frame. The gravitational field is then subtracted, providing the natural acceleration, which is integrated twice to determine the position, and the conditions on the start and end of the step are processed to eliminate the position drift. This drift correction approach, illustrated by FIG. 1 of the seventeenth article, is completely different to that of the present invention.

An eighteenth article "Self-contained Position Tracking of Human Movement Using Small Inertial/Magnetic Sensor Modules" by Yun Xiaoping, E. R. Bachmann, H. Moore, and J. Calusdian, IEEE International Conference on Robotics and Automation, 2007, describes a personal navigation system not requiring a particular infrastructure. Postural tracking is obtained by means of a set of inertial/magnetic sensors mounted on the moving subject's limbs. The sensor modules in question contain three gyrometers, three accelerometers, and three magnetometers (these sensors are triaxial and each of the three axes is mounted at a right angle). The authors note the drift introduced by the accelerometers: in this case, they process the gait properties (i.e. zero-velocity phases) to correct the measurements output by the accelerometers. The moving frame is converted to the fixed frame using the attitude (given in the form of a quaternion) provided directly by the sensor module, which integrates a Kalman filter. The description does not give specific information on the sensors used for calculating this orientation.

A nineteenth article, "Spatio-temporal parameters of gait measured by an ambulatory system using miniature gyroscopes", by K. Aminian, B. Najafia, C. Bülab, P.-F. Leyvrazc and Ph. Robert, in Journal of Biomechanics, Vol. 35(5), pp. 689-699, 2002, describes a data acquisition system for estimating spatio-temporal parameters of gait. For this purpose, the authors use the angular velocity measurement at the lower limbs. The measurement device uses gyrometers and force sensors for validation. The parameters are estimated by means of wavelet transform. Therefore, this is very far from a navigation system such as that proposed in the present invention. Furthermore, the authors do not discuss gyrometer drift since they deal with data preprocessed by means of wavelet transform.

These various systems have a limited precision and a high cost. They do not address the problem of the drift of the orientation globally accounting for data on the path. They frequently require a greater number of sensors than that of the present invention.

According to one aspect of the invention, a system for estimating the path of a moving element or body is proposed, comprising a sensor assembly comprising an accelerometer and a gyrometer which are rigidly connected. The system comprises means for retroactively correcting an angular position obtained on the basis of the gyrometer measurements for at least one time from a plurality of successive times of a time interval based on Cartesian positions of the accelerometer for at least two of said successive times and predetermined data representing the path of the accelerometer during said time interval, and based on a rotation suitable for minimising a drift between said predetermined data and the equivalent thereof on the path obtained after rotation.

The predetermined data may relate to the orientation of the path. This orientation may be calculated on the basis of the estimated path. For example, if the predetermined data is the orientation of the direction of the step in relation to the North (or gait heading), then the equivalent thereof on the path is calculated for example taking the angle between the North-South direction and the projection on the horizontal plane of the vector linking the first and last position of the step path.

Such a system is suitable for compensating the drift by adjusting the estimated angles by integrating the gyrometer measurements on the basis of the path obtained. This makes it possible to address the problem of drift globally.

Furthermore, the aim of the present invention is that of obtaining a path correction without using measurement data from the magnetometer. The correction is merely based on the measurements obtained from the accelerometer and the gyrometer.

In the present invention, the attitude of the moving frame is obtained via digital integration of the gyrometric measurements, and the drift is compensated not on accelerometric measurements, but on the estimated attitude, accounting for hypotheses on the path, such as for example, movement of the pedestrian in a horizontal plane.

The time interval may consist of a foot swing phase.

In one embodiment, the system further comprises:
  means for storing first measurements output by the accelerometer and second measurements output by the gyrometer at said plurality of successive times of said time interval, in a moving frame associated with the sensor assembly, in memory;

first means for determining said angular position of the gyrometer defined by the angles of rotation in relation to reference positions along the axes of a fixed global frame associated with the Earth's frame, at said successive times, on the basis of said second measurements; and second means for determining said Cartesian position of the accelerometer, in said fixed global frame, at said successive times, on the basis of said first measurements and said angular position provided by said first determining means.

In this way, the path may be obtained and the position drift may be corrected.

More particularly, the system according to the invention is suitable for estimating a path of a moving element or body, using:

the accelerometer suitable for outputting data measurements, the gyrometer suitable for outputting angular velocity measurements, first means for estimating the angular position based on the angular velocity measured by the gyrometer, for at least two times from a plurality of successive times of a time interval, second means for estimating the path of the moving element or body comprising, for at least two of said successive times, a Cartesian position of the accelerometer, based on the measurements of said accelerometer, and based on the previously estimated angular position, and third means for estimating a rotation suitable for minimising a drift between predetermined data representing the path to be estimated and the equivalent thereof on the rotated path, obtained after rotating the previously estimated path, means for retroactively correcting the angular position at said at least two times estimated by the first estimating means, based on the results of the estimated rotation by the third estimating means, fourth means for estimating the corrected path of the moving element or body comprising a corrected Cartesian position of the accelerometer for at least two of said successive times, based on the measurements of the accelerometer, and based on the corrected angular position.

According to one embodiment, said correction means are suitable for correcting said angular position iteratively.

In this way, the precision is enhanced.

In one embodiment, said predetermined data representing the path of the accelerometer comprising a substantially planar path of the accelerometer between a first time and a second time which are different, from said successive times of said time interval.

In this way, a feature commonly encountered in movements, particularly in humans, animals or robots, is taken into account and the precision is thus enhanced.

For example, the movement of an ankle during walking is substantially planar.

In one embodiment, the orientation of the path plane is known in relation to the vertical or the North.

In this way, the precision is enhanced.

According to one embodiment, the path between said first and second times comprises a known heading and/or a known slope.

It is thus possible to account for data stored in memory relating to the slope of the user's location or the heading of the movement (when moving in a corridor for example), for which the angular position regularly returns to the same value.

In one embodiment, said first and second times are limits of said time interval.

In this way, in the case of cyclical movements, the time interval consists of a cycle or a part of the cycle (for example, in the case of walking, the time interval consists of the phase separating two successive zero-velocity times for a foot).

Moreover, if the time interval consists of a moving phase bordered by two immobile phases (or "MidStance" in the case of walking) as in the case of walking, the planar movement hypothesis relates to all the movement during a step.

According to one embodiment, said predetermined data representing the accelerometer path comprise potential Cartesian positions which are stored in memory.

In this way, the path rotation calculation accounts for these potential passage points.

In one embodiment, said retroactive correction means are suitable for distributing the correction in a predetermined manner over all or part of said plurality of successive times. For example, the correction is linear, or equidistributed.

In this way, the correction is not the same at each time and potential progression of the drift over time may be taken into account.

For example, said correction means are suitable for increasing the correction linearly over all or part of said plurality of successive times.

A linear distribution of the correction makes it possible not to have any preconceptions on the times at which the correction needs to be made, but account for the fact that this correction increases over time which is the case when the gyrometer has a bias.

In one embodiment, the system is suitable for being mounted on a user, a mobile terminal, or a land, air or sea vehicle.

A user may be living (human or animal) or artificial.

In this way, the path of the location where the system is mounted may be estimated.

According to one embodiment, the system comprises means for mounting in the vicinity of a user's ankle.

According to a further aspect of the invention, a method for estimating the path of a moving element or body is proposed, wherein an angular position is corrected retroactively, on the basis of the results of the following successive steps consisting of:

estimating an angular position based on the measurements of a gyrometer, for at least one time from a plurality of successive times of a time interval, estimating a Cartesian position of the accelerometer rigidly connected to the gyrometer for at least one of said successive times based on the measurements of the accelerometer, and predetermined data representing the path of the accelerometer during said time interval, and estimating a rotation suitable for minimising a drift between said predetermined data and the equivalent thereof on the path obtained after rotation.

For this purpose, the invention relates to a method for estimating a path of a moving element or body using a sensor assembly, wherein said sensor assembly is mounted on the moving element or body and comprises an accelerometer and a gyrometer which are rigidly connected, comprising the following steps:

receiving acceleration values provided by the accelerometer and measured for at least two times from a plurality of successive times of a time interval, receiving angular velocity values provided by the gyrometer and measured for at least two times from said plurality of successive times of said time interval, processing the values provided for estimating at least one angular position value using the angular velocity values and at least two Cartesian position values defining a path of the moving element or body using acceleration values and said at least one previously estimated angular position value, further comprising the following steps:

estimating rotation parameters, by inverting a rotational realignment model of the estimated path subject to prior knowledge of the path, wherein this prior knowledge consists of predetermined parameters of the path, and retroactively correcting said at least one estimated angular position value, by applying a rotation on this value using estimated rotation parameters, so as to provide at least one corrected angular position value.

Optionally, the retroactive correction step further comprises retroactive correction of the Cartesian position values using the acceleration values and said at least one corrected angular position value.

Also optionally:

the acceleration values provided by the accelerometer and the angular velocity values provided by the gyrometer are expressed in a moving frame associated with the sensor assembly, and during the step for processing the values provided, the estimation of said at least one angular position value is expressed in the form of rotational angle parameters in relation to the axes of a fixed global frame linked with the Earth's frame and the estimation of said Cartesian position values is expressed in the form of Cartesian coordinates in the same fixed global frame.

Also optionally, the retroactive correction step is performed in a plurality of iterations, for an iterative correction of said at least one estimated angular position value.

Also optionally, the rotation parameters are those of a quaternion.

Also optionally, the prior knowledge of the path includes angular orientation parameters, particularly in relation to the vertical and the North, of a plane considered to contain the path.

Also optionally, the prior knowledge of the path includes the Cartesian coordinates of at least two points considered to be part of the path.

Also optionally, the prior knowledge of the path includes heading or slope parameters of the path.

Also optionally, the retroactive correction step is devised so that the correction made using estimated rotation parameters is distributed in a predetermined manner over all or part of said plurality of successive times.

Also optionally, the predetermined distribution of the retroactive correction is defined so as to increase, in a linear fashion, correction parameters calculated using estimated rotation parameters over all of part of said plurality of successive times.

The invention also relates to a computer program downloadable from a communication network and/or saved on a computer-readable medium and executable by a processor, comprising instructions for executing the steps of a method for estimating a path according to the invention, when said program is executed on a computer.

Finally, the invention also relates to a system for estimating a path of a moving element or body, comprising:

an accelerometer suitable for providing acceleration values measured at successive times of a given time interval, a gyrometer rigidly connected to the accelerometer, suitable for providing angular velocity values measured at successive times of said time interval, and means for processing the values provided by the accelerometer and the gyrometer devised for implementing a method for estimating a path according to the invention.

Optionally, such a system for estimating a path may comprise means for rigidly mounting the accelerometer and the gyrometer on a user, for example on the user's ankle, on a mobile terminal or on a land, air or sea vehicle.

The invention will be understood more clearly on studying some embodiments described as non-limiting examples illustrated by the appended figures wherein.

Figure 6A:
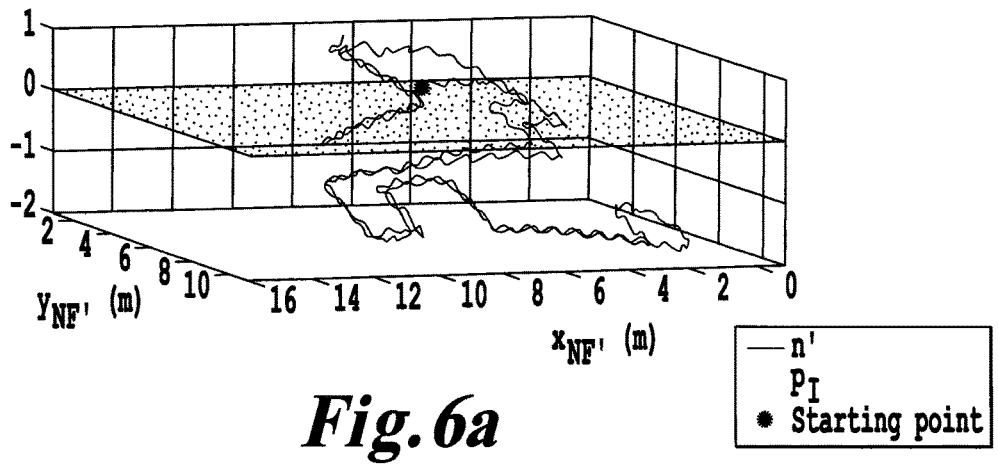
Figure 6B:
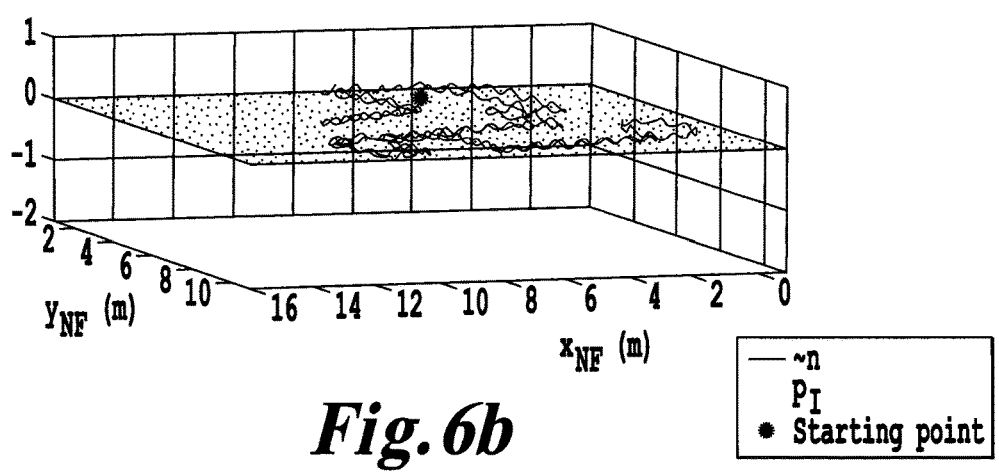
Figure 6C:
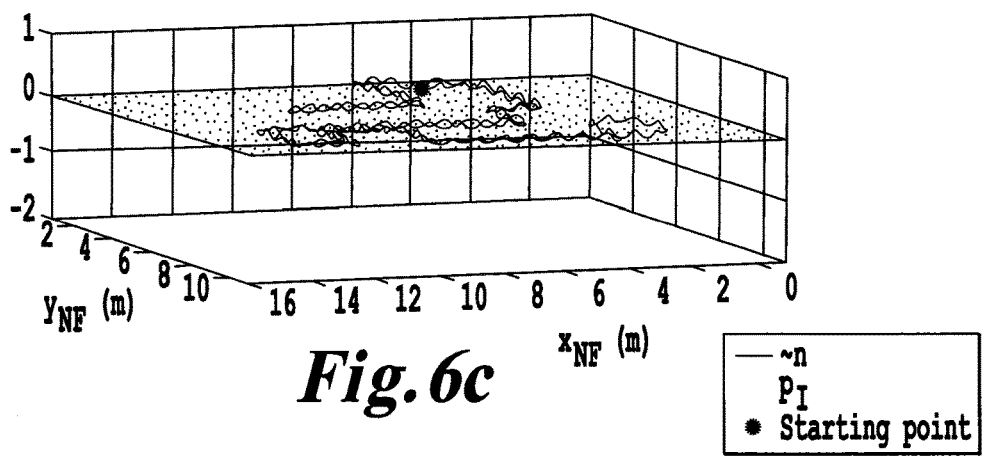
Figure 7A:
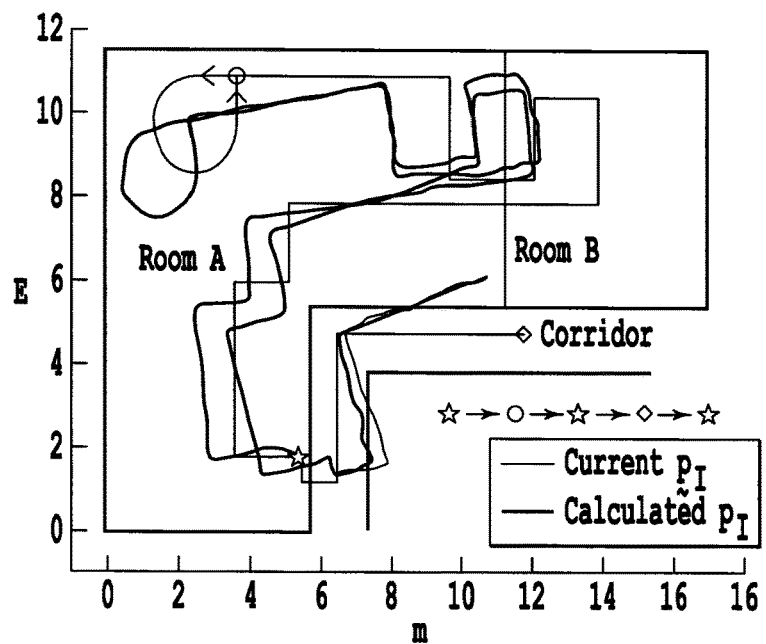
Figure 7B:
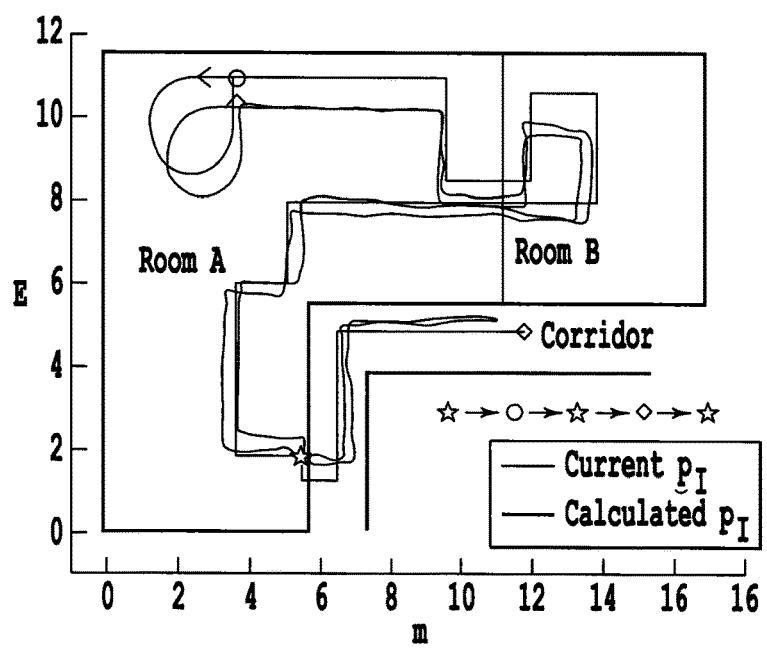

FIGS. 6a, 6b and 6c illustrate the estimated paths without correcting the drift (6a), by performing a retroactive correction of the drift, but applying a constant angular correction for the duration of each step (6b), and performing a recursive correction and a linear retroactive correction (6c); and FIGS. 7a and 7b illustrate projections on the horizontal plane of the paths in FIGS. 6b and 6c: the curves marked in bold lines represent an estimated return journey, the curves marked in fine lines represent the route actually travelled.

Throughout the figures, elements having the same references are similar.

The present invention proposes, once a step is detected (by means of a step detection algorithm suitable for determining the start and end of a step), to integrate the measurements of the gyrometer to determine an estimation of the orientation, reference the accelerometer measurements to the inertial frame, compensate for the gravitational field and integrate the natural acceleration obtained at each sampling time twice to obtain an estimated path for the duration of the step.

The prior knowledge in relation to a step is used and combined with the path, i.e. expressed in the form of predetermined parameters of the path representing predetermined data, so as to determine an orientation correction (minimising the drift between the predetermined data and the equivalent thereof on the estimated path) applied to the initially estimated angles.

Subsequently, in deferred time, the measurements provided by the accelerometers are reused, for estimating the corrected path. If the drift between the predetermined data and the equivalent thereof on the path exceeds a threshold, the cycle for estimating an angle correction and the re-estimation of the path are resumed.

Figure 1:
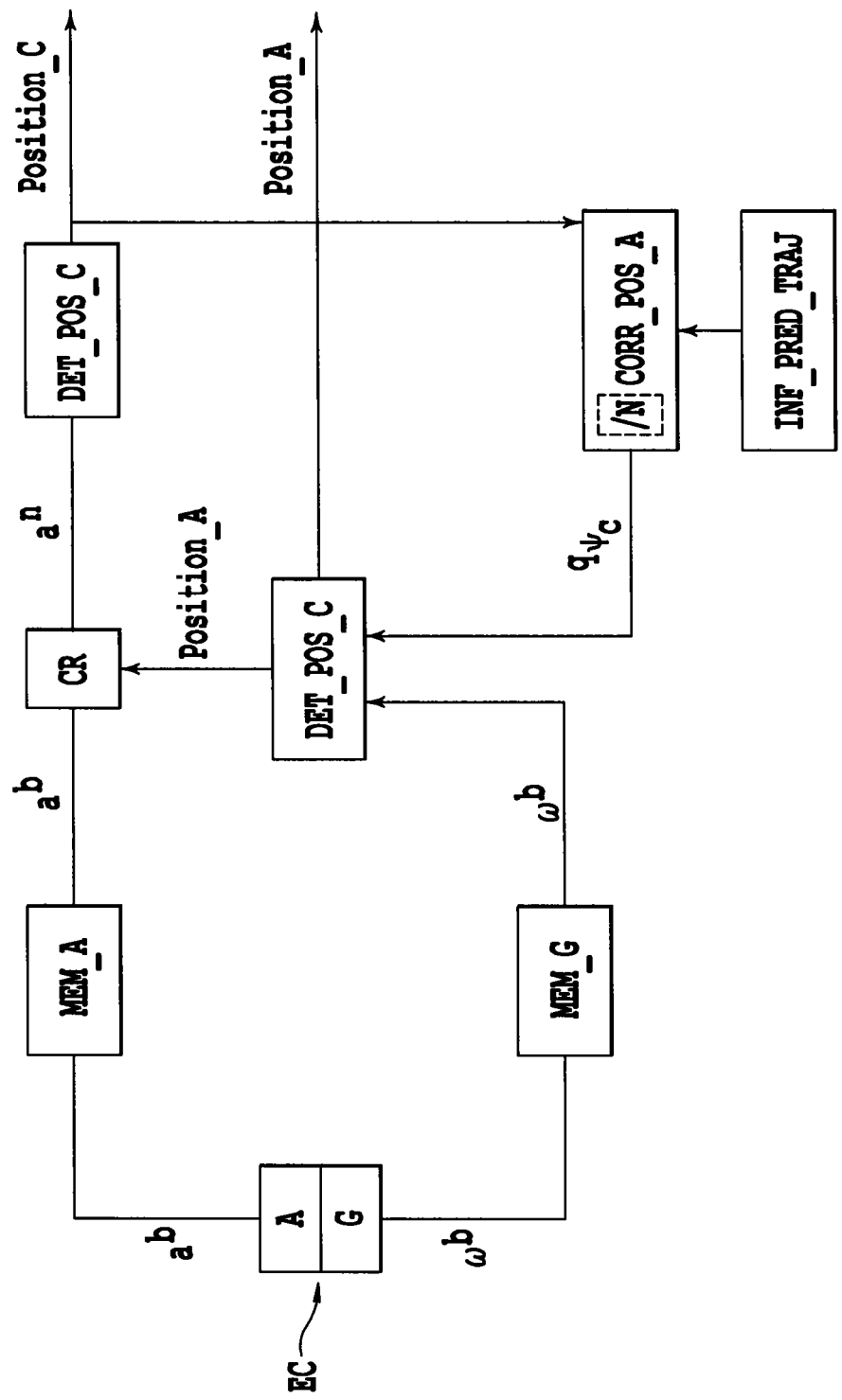
FIG. 1 illustrates an embodiment of a system according to one aspect of the invention.

In FIG. 1, a system for estimating a path comprises a sensor assembly EC provided with an accelerometers A with at least one measurement axis and a gyrometer G with at least one measurement axis which are rigidly connected.

The system comprises a module for retroactively correcting CORR_POS_A and angular position Position_A of the gyrometer G from a plurality of successive times, corresponding to the sampling times over a time interval, based on the Cartesian positions Position_C of the accelerometer A for at least two of said successive times and predetermined data INF_PRED_TRAJ representing the path of the accelerometer A during the time interval $[t_1; t_2]$ by means of a rotation, which, applied to the path, is suitable optimally verifying said predetermined data, i.e. minimising a deviation between said predetermined data INF_PRED_TRAJ and the equivalent thereof on the path obtained after rotation. In other equivalent terms, a model for the rotational realignment of the path obtained using the measurements of the accelerometer A so that it corresponds to the predetermined data (i.e. the prior knowledge expressed in the form of predetermined parameters of the path) as much as possible is inverted to determine the rotation parameters of the rotational realignment, the rotation parameters subsequently being used to correct said angular position Position_A.

The time interval is delimited by a first limit $t_1$ and by a second subsequent limit $t_2$. The samples over the time interval $[t_1; t_2]$ are indexed $t^l$ such that l varies between 1 and N, and $t^1$ equals $t_1$, and $t^N$ equals $t_2$. The path is defined as the set of successive Cartesian positions Position_C.

The limits $t_1$ and $t_2$ may consist of two successive zero-velocity times for a foot, delimiting a phase between zero-velocity times for a foot or "Mid-Stance" times.

The system further comprises a module MEM_A for storing first measurements $a^b$ output by the accelerometer A in memory, and a module MEM_G for storing second measurements $\omega^b$ output by the gyrometer G at said plurality of successive times of said time interval, in a moving frame BF associated with the sensor assembly EC, in memory.

A first determination module DET_POS_A determines the angular position Position_A of the gyrometer G defined by angles or a quaternion representing the rotation suitable for switching from the frame NF to the frame BF at said successive times $t^1, t^2, \ldots t^{N-1}, t^N$, based on the second measurements $\omega^b$.

A second determination module DET_POS_C determines the Cartesian position Position_C of the accelerometer A, in the fixed global frame NF, at said successive times $t^1, t^2, \ldots t^{N-1}, t^N$, based on the first measurements $a^b$ and the angular position Position_A provided by the first determination module DET_POS_A, after a change of frame performed by a module for changing frame CR suitable for switching from the local frame BF to the frame NF (since, after iterations, NF' tends to converge with NF, as described hereinafter in the description).

The retroactive correction module CORR_POS_A is suitable for iteratively correcting the angular position Position_A. The correction may be applied either at angular velocities (i.e. before integrating the measurements of the gyrometer G, or applied to angles (i.e. after integrating the measurements of the gyrometer G)

Furthermore, the retroactive correction module CORR_POS_A is suitable for correcting the Cartesian position Position_C for at least one of said successive times $t^1, t^2, \ldots t^{N-1}, t^N$.

The predetermined data INF_PRED_TRAJ may comprise a data item in respect of a substantially planar path of the accelerometer between a first time and a second time, which are different, from said successive times $t^1, t^2, \ldots t^{N-1}, t^N$ of said time interval $[t_1; t_2]$.

The orientation of the plane about which the points of the path may be situated may be known in relation to the vertical or North. The path between said first and second times may comprise a known heading and/or a known slope.

The first and second times may be the limits of the time interval.

The predetermined data INF_PRED_TRAJ may comprise potential Cartesian positions which are stored in memory, i.e. the Cartesian coordinates of points considered in principle to be part of the path.

The system may be suitable for being mounted on a user, a mobile terminal, or a land, air or sea vehicle. For example, it may be provided with means for mounting in the vicinity of a user's ankle.

The present invention is to be compared to a conventional approach for estimating the path of a solid on the basis of measurements provided by a gyrometer and an accelerometer comprising four steps:

integrating the gyrometric measurements to estimate the orientation of the frame BF associated with the sensor assembly EC with respect to the frame of reference NF;

referencing the accelerometric measurements of the frame BF of the sensor assembly EC in the reference frame NF;

compensating for gravity to obtain the natural acceleration of the solid in the reference frame; and performing a double integration of the acceleration over time.

Given the bias existing on the measurements, it is well known that this approach cannot provide a correct path in the long term. Furthermore, techniques are known which attempt to correct the drift of the path.

One original feature of the present invention is in that, on the basis of the knowledge on the path (the path is defined by the set of Cartesian positions between two given times), the rotation is determined, which by rotating the path, makes it possible to provide the knowledge on the path, correct the orientation or angular position Position_A using the rotation thereof and recalculating the path.

It should be noted that the correction is applied over a given time window.

Furthermore, the correction approach may be iterative.

Figure 2A:
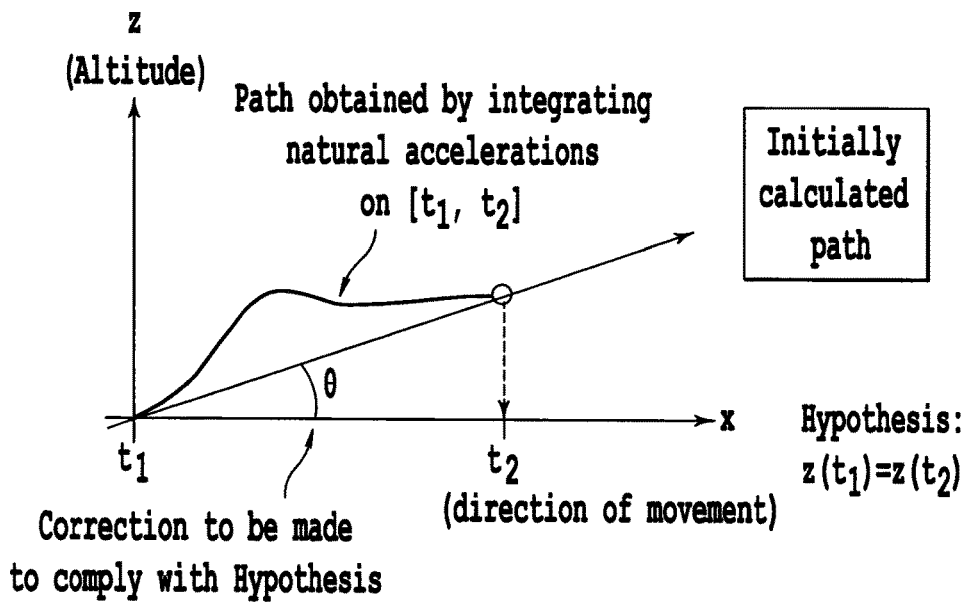
FIGS. 2a and 2b illustrate an example associated with a pedestrian's gait.
Figure 2B:
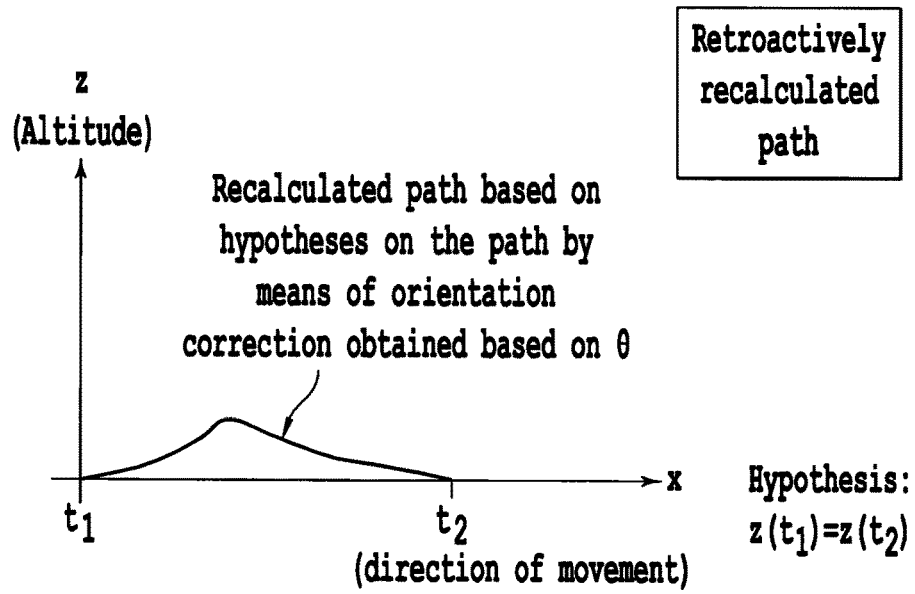

Let us take the example of gait illustrated in FIGS. 2a and 2b. Based on hypotheses on the movement, for example that the altitude at the starts and end of the step are the same, the angle correction θ to be applied so that the constraints on the path are met, in this case, the altitude at the time $t_1$ is equal to the altitude at the time $t_2$, is deduced.

This correction Pos_A_C is distributed, in a predetermined manner to be defined, for example linearly, by means of equidistributed division of the correction by dividing by the number of samples N, on the attitudes or angular positions Position_A determined using the gyrometric measurements. The path is then recalculated.

The frames used in this patent application and the sensor model used are defined hereinafter.

It is assumed that the inertial measurement units (IMU), i.e. the sensor assembly EC, measure three-dimensional or 3D vectors.

All these vectors are measured in the frame BF of the sensor assembly EC, meaning that the measurements are dependent on the attitude or orientation of the sensor.

The sensor assembly EC is mounted on the moving body. In this way, the instantaneous rotation vector measurement is necessary, due to changes in attitude or angular position of the sensor assembly EC over time.

Firstly, it is necessary to define four frames referenced NF, BF, SF and NF' respectively.

The North frame or fixed global frame NF is a fixed frame in the Earth's frame of reference. It is used during the entire movement (walking or running). The North frame NF may be considered to be the reference frame: orientations or angular positions and positions or Cartesian positions are measured in this frame. The fixed global frame NF is defined by the origin $O_{NF}$ thereof and axes ($x_{NF}$, $y_{NF}$, $z_{NF}$) thereof. The axes refer to the Earth's frame of reference in the East, North and Upward directions. The origin $O_{NF}$ thereof may consist of the point where the movement starts or any other point. The data expressed in this frame are noted with an exponent n.

The local or sensor-related frame or "Body Frame" BF is the frame of reference of the sensor assembly EC wherein the raw data are measured. The centre thereof is $O_{BF}$. The data in this frame are noted with an exponent b. The axes ($x_{BF}$, $y_{BF}$, $z_{BF}$) thereof consist of the axes of the sensors (in the case of triaxial sensors) at each time. The coordinates of the origin $O_{BF}$ thereof in the fixed global frame NF consist of the location of the sensor in the fixed global frame NF.

An intermediary "Step Frame" SF is defined. In the present application, the step frame SF is a frame associated with the Earth, but only for a time interval [$t_1$, $t_2$] (for example during a step). This frame is used for movements having less than six degrees of freedom or DOF. For example, it used when the sensor assembly EC has an invariant axis of rotation and/or a plane movement during the time interval [$t_1$, $t_2$].

$x_{SF}$ is the axis of rotation and the sensor assembly EC is subject to a plane movement in the plane defined by ($y_{SF}$, $z_{SF}$). Whenever the plane is vertical, $y_{SF}$ is chosen as the horizontal axis, whereas the axis $z_{SF}$ is the vertical axis. The origin of this frame SF consists of the location of the sensor at the start of the time interval (for example at $t=t_1$). The data expressed in this frame are noted with an exponent s.

The frame NF' is a frame close to the frame NF accounting for the drift due to the integration of the gyrometer. Let us assume that this zero drift NF and NF' converge. Otherwise, the frame NF' is defined by the axes ($x_{NF'}$, $y_{BF'}$, $z_{BF'}$) and the centre $O_{BF'}$.

The frame NF' is the frame in relation to which, before correction, the angular position Position_A obtained by integrating the gyrometer and the Cartesian position Position_C estimated by means of the double integration of the natural acceleration are expressed.

Figure 3:
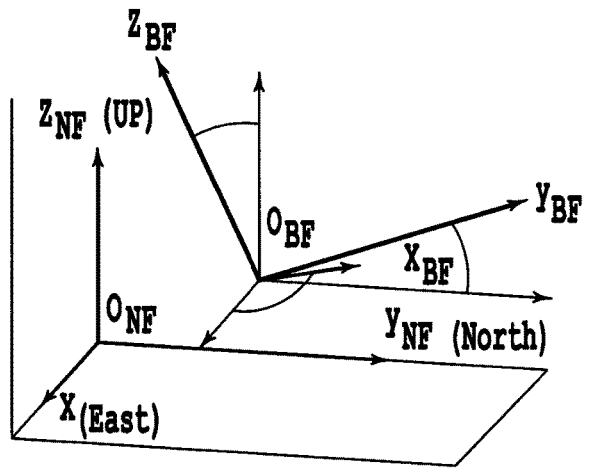
FIG. 3 represents the fixed global NF and local BF frames.

FIG. 3 represents the fixed global NF and local BF frames. As shown, the local frame BF is correlated with the fixed global frame NF by means of translation and rotation.

The rotation between the frames required to obtain the data measured by the sensor assembly EC in the frame NF needs to be calculated. For this purpose, a rotation matrix $R_{nb}$ is defined, which converts a vector x, expressed in the frame BF associated with the sensor assembly, to the same vector in the fixed global frame NF by means of the following equation:

$$x^n = R_{nb} x^b \qquad (1)$$

The inverse transformation matrix is $R_{bn} = R_{nb}^{-1} = R_{nb}^T$.

The orientation of the fixed frame NF in the local frame BF may be expressed by the unit quaternion $q_{bn}$, where $\|q_{bn}\|_2 = 1$.

Note that, hereinafter in the description, the angular positions or attitudes and angular corrections are expressed by quaternions, but not in a limiting manner, these values could be expressed differently, for example Euler angles.

In the present application, all the quaternions are, for example unit quaternions.

The unit quaternion $q_{bn}$ is described with the angle of rotation $\psi$ about the axis of rotation defined by the three-dimensional unit direction vector $q_{bn}$ or with a four-dimensional unit vector as follows:

$$q_{bn} = \begin{bmatrix} \cos(\psi/2) \\ \sin(\psi/2) q_{bn} \end{bmatrix} = [q_{bn,0}\ q_{bn,1}\ q_{bn,2}\ q_{bn,3}]^T \qquad (2)$$

It may be noted that $q_{nb}$ is the conjugate of $q_{bn}$, and that:

$$q_{nb} = \begin{bmatrix} \cos(\psi/2) \\ -\sin(\psi/2) q_{bn} \end{bmatrix} = [q_{bn,0}\ -q_{bn,1}\ -q_{bn,2}\ -q_{bn,3}]^T \qquad (3)$$

The rotation matrix $R_{nb}$ is correlated with the quaternions by means of the following equation:

$$R_{bn} = \begin{bmatrix} 2q_{bn,0}^2 - 1 + 2q_{bn,1}^2 & 2q_{bn,1}q_{bn,2} - 2q_{bn,0}q_{bn,3} & 2q_{bn,1}q_{bn,3} + 2q_{bn,0}q_{bn,2} \\ 2q_{bn,1}q_{bn,2} + 2q_{bn,0}q_{bn,3} & 2q_{bn,0}^2 - 1 + 2q_{bn,2}^2 & 2q_{bn,2}q_{bn,3} - 2q_{bn,0}q_{bn,1} \\ 2q_{bn,1}q_{bn,3} - 2q_{bn,0}q_{bn,2} & 2q_{bn,2}q_{bn,3} + 2q_{bn,0}q_{bn,1} & 2q_{bn,0}^2 - 1 + 2q_{bn,3}^2 \end{bmatrix} \qquad (4)$$

The model of the measurements provided by the sensors used in one embodiment wherein the accelerometer and the gyrometer are triaxial is now described.

The accelerometer measures the sum of the accelerations applied to the sensor.

On Earth, the accelerometer measures, in addition to the Earth's gravity, the natural acceleration applied to the sensor. The natural acceleration $a_p$ is defined as the external acceleration applied to the sensor, which is equal to the time derivative of the sensor velocity. In this way, the acceleration $a^b$ provided by the sensor in the local frame BF is given by the following equation:

$$a^b(t) = R_{bn}(t) a^n(t) = R_{bn}(t)(a_p{}^n(t) - g^n) \qquad (5)$$

Wherein t represents the time, $g^n = [0\ 0\ -g]^T$ represents the Earth's gravity vector where $g=9.81$ m/s$^2$ and $a_p{}^n$ represents the natural acceleration in the fixed global frame NF.

Note that this equation is purely static, unlike the equation relating to the gyrometer measurements which is dynamic. Moreover, the measurements may be corrupted by noise.

The gyrometer provides measurements for determining an orientation quaternion. Let $q_{bn}(t) = [q_{bn,0}(t) q_{bn,1}(t) q_{bn,2}(t) q_{bn,3}(t)]^T$ be the variable quaternion over time describing the orientation of the local frame BF in relation to the fixed global frame NF. It is known that the dynamic model of the orientation quaternion $q_{bn}(t)$ observes the following first-order differential equation:

$$\dot{q}_{bn}(t) = \Omega^b(t) q_{bn}(t) \qquad (6)$$

-continued $$= \frac{1}{2} \begin{bmatrix} 0 & -\omega_x^b(t) & -\omega_y^b(t) & -\omega_z^b(t) \\ \omega_x^b(t) & 0 & \omega_z^b(t) & -\omega_y^b(t) \\ \omega_y^b(t) & -\omega_z^b(t) & 0 & \omega_x^b(t) \\ \omega_z^b(t) & \omega_y^b(t) & -\omega_x^b(t) & 0 \end{bmatrix} \begin{bmatrix} q_{bn,0}(t) \\ q_{bn,1}(t) \\ q_{bn,2}(t) \\ q_{bn,3}(t) \end{bmatrix}$$

wherein $\omega^b = [\omega_x^b(t)\ \omega_y^b(t)\ \omega_z^b(t)]^T$ denotes the angular velocity given by the gyrometer expressed in the local frame BF.

To calculate the (unit) orientation quaternion $q_{bn}(t)$, the first module DET_POS_A for determining the angular position Position_A of the gyrometer G integrates the differential equation (6) based on $q_{bn}(0)$, where $q_{bn}(0)$ consists of the initial orientation.

As the continuous function $\omega^b(t)$ is not known, but merely sampling of samples $\omega^{b(l)}$, the orientation quaternion samples $q_{bn}^{(l)}$ may be determined by means of recursive integration of the equation (6).

It is assumed that the sampling period $T_s$ is sufficiently small to assume that $\omega^b(t)$ is constant between the time indices (l–1) and (l), and that $\omega^b(t)$ is equal to $\omega^{b(l-1)}$ over this time interval. In this way, $q_{bn}^{(l)}$ is calculated by integrating the differential equation (6), based on $q_{bn}^{(l-1)}$, for a time $T_s$:

$$q_{bn}^{(l)} = \exp(\Omega^{b(l-1)} T_s) q_{bn}^{(l-1)} \quad (7)$$

It can be demonstrated that the calculation of $q_{bn}^{(l)}$ in the equation (7) can be obtained using the product $\otimes$ associated with the quaternions, by means of the following equation:

$$q_{bn}^{(l)} = f_q(q_{bn}^{(l-1)}, \omega^{b(l-1)}) = q_{-\omega}^{b(l-1)} \otimes q_{bn}^{(l-1)} \quad (8)$$

wherein:

$$q_{-\omega}^{b(l)} = [q_{-\omega,0}^{b(l)}\ q_{-\omega,1}^{b(l)}\ q_{-\omega,2}^{b(l)}\ q_{-\omega,3}^{b(l)}]^T \quad (9)$$

$$= \begin{bmatrix} \cos(\|\omega^{b(l)}\| T_s/2) \\ -\sin(\|\omega^{b(l)}\| T_s/2) q_\omega^{b(l)} \end{bmatrix}$$

$$= \begin{bmatrix} \cos(\|\omega^{b(l)}\| T_s/2) \\ -\dfrac{\sin(\|\omega^{b(l)}\| T_s/2)}{\|\omega^{b(l)}\|} \omega^{b(l)} \end{bmatrix}$$

denotes the angle rotation quaternion $\|\omega^{b(l)}\| T_s$ about the vector $-q_\omega^{b(l)}$ Note that the gyrometer measurements are corrupted by noise and a drift (or offset). Consequently, direct integration of the equation (6) (or of the discretised version thereof) gives rise to a corrupted estimation of the attitude quaternion and thus of the attitude or angular position.

It can be noted that, in the prior art, the orientation drift is generally expressed as an incorrect orientation of the local frame BF. As the main problem of orientation is that of changing frame to express the acceleration data of the local frame BF to the fixed global frame NF, an incorrect quaternion $q_{nb}$ is considered not to be suitable for changing the frame of the local frame BF to the fixed global frame NF, but to the frame NF' subject to drift, i.e. having progressively rotated. Consequently, NF' is defined as a frame having deviated in relation to the fixed global frame NF; it is described by the orientation thereof in relation to the fixed global frame NF given by the quaternion $q_{n'n}$. The frame NF' drifts slowly over time and the orientation quaternion $q_{n'n}$ thereof thus varies slowly over time such that these quaternions observe the following equation: $q_{bn}(t) = q_{bn'}(t) \otimes q_{n'n}(t)$.

An example of an embodiment, illustrated with quaternions, applied to a subject's gait, is described hereinafter.

The handling of the error on the gravitational field during the natural acceleration calculation is now described.

Let $[t_1^\kappa, t_2^\kappa]$ be the movement or swing phase SW (with the foot in the air) time interval of the stride of the detection step number $\kappa$ (corresponding to step number $\kappa$). It is assumed that $q_{n'n}(t)$ is invariant over time during each swing phase SW for $t \in [t_1^\kappa, t_2^\kappa]$.

A further problem is the drift in the position due to the double integration over time of the acceleration measurements.

To limit the position drift, the acceleration is only integrated during the swing phase SW, whereas during the remaining time, the velocity is set to zero.

Using step detection methods, it is possible to determine if the foot is moving or not.

The velocity of a pedestrian's ankle is calculated step by step, whereas the orientation is determined continuously at the time index l with the quaternion $q_{bn'}^{(l)}$ determining the orientation of the frame NF' in the local frame BF (and not the fixed global frame NF due to the integration of the noise and drift existing on the gyrometer measurements).

Failing the orientation observation, it is not possible to determine the rotation quaternion $q_{nn'}$. For this reason, it is not possible to determine $q_{bn}$.

Consequently, the orientation of the sensor in the frame NF' is merely calculated by integrating three-dimensional angular speed measurements:

$$\omega^b = [\omega_x^b \omega_y^b \omega_z^b]^T, \quad (10)$$

as in the equation $$q_{bn'}^{(l)} = q_{-\omega}^{b(l-1)} \otimes q_{bn'}^{(l-1)} \quad (11)$$

wherein, $\otimes$ represents the product of two quaternions and $$q_{-\omega}^{b(l)} = [\cos(\|\omega^{b(l)}\| T_s/2) \sin(\|\omega^{b(l)}\| T_s/2) q_{-\omega}^{b^T}]^T \quad (12)$$

$T_S$ is the sampling period of the sensors A and G, and $q_{-\omega}^b = -\omega^b / \|\omega^b\|$ is the axis of the rotation defined by the quaternion $q_{bn'}$.

Once the orientation of the local frame BF is determined, the acceleration terms are simply expressed in the frame NF' subject to drift, as in the equation:

$$a^{n'(l)} = R_{n'b}^{(l)} a^{b(l)} \quad (13)$$

wherein $R_{n'b}^{(l)}$ is correlated with $q_{n'b}^{(l)}$ as in the equation (4). This step is performed by the frame change module CR.

Once $a^{n'}$ is known, the gravity should be compensated to calculate the natural acceleration.

The main problem is that the vertical direction of the frame NF' is different to that of the fixed global frame NF.

Even if, at the start, the process commences with a known sensor orientation, the calculate orientation drifts over time. This means that the Earth's gravity $g^{n'}$ cannot be determined accurately. It is not more acceptable to assume that $g^{n'} = g[0\ 0\ -1]^T$ to deduce the gravity based on the acceleration $a^{n'}$.

For this reason, the following equation:

$$a_p^{n'} = a^{n'} + g^{n'} \neq a^{n'} + g^n \quad (14)$$

shows that the gravity is not the same in both frames.

In fact, such an approximation would corrupt the natural acceleration.

Consequently, a significant error would be introduced into the estimation of the position or Cartesian position, after the double integration of this bias affecting the natural acceleration.

Another way of determining $g^{n'}$ consists of using the acceleration $a^{n'}(t)$ during the time interval $[t_1^\kappa, t_2^\kappa]$. More specifically, this gives $v_I^{n'}(t_1^\kappa) = v_I^{n'}(t_2^\kappa) = 0$, where $v_I^{n'}$ denotes the three-dimensional velocity vector obtained from the temporal integration of $a_p^{n'}$.

Assuming that the quaternion $q_{n'n}$ is invariant over time for $t \in [t_1^\kappa, t_2^\kappa]$, the following equation is obtained:

$$\int_{t_1^\kappa}^{t_2^\kappa} a^{n'}(t) dt = \int_{t_1^\kappa}^{t_2^\kappa} R_{n'n}(a_p^n(t) - g^n) dt \quad (15)$$
$$= R_{n'n} \int_{t_1^\kappa}^{t_2^\kappa} (a_p^n(t) - g^n) dt$$
$$= v_I^{n'}(t_2^\kappa) - v_I^{n'}(t_1^\kappa) - (t_2^\kappa - t_1^\kappa) g^{n'}$$
$$= -(t_2^\kappa - t_1^\kappa) g^{n'}$$

wherein $R_{n'n}$ is correlated with $q_{n'n}$, according to the equation (4).

According to the equation (15), the mean value of $a^{n'}$ over the interval $[t_1^\kappa, t_2^\kappa]$ is equal to the gravity $g^{n'}$. In this way, it is necessary to centre $a^{n'}$ before the double integration for compensate for the Earth's gravity, as in the following equation:

$$a_p^{n'}(t) = a^{n'}(t) - \frac{1}{t_2^\kappa - t_1^\kappa} \int_{t_1^\kappa}^{t_2^\kappa} a^{n'}(t) dt \quad (16)$$

Ultimately, the acceleration is integrated twice, separately for each step, so as to calculate, after all, the full path of the ankle. This gives the following system:

$$v_I^{n'}(t) = v_I^{n'}(t_1^\kappa) + \int_{t_1^\kappa}^{t} a_p^{n'}(t) dt \quad (17)$$
$$p_I^{n'}(t) = p_I^{n'}(t_2^{\kappa-1}) + \int_{t_1^\kappa}^{t} v_I^{n'}(t) dt$$

wherein $p_I^{n'} = [x_I^{n'} y_I^{n'} z_I^{n'}]^T$ denotes the three-dimensional Cartesian coordinates of the sensor assembly EC in NF', $v_I^{n'}(t_1^\kappa) = 0/s$, $\forall \kappa$, and $p_I^{n'}(0)$ is set to $O_{NF'}$.

As the acceleration in the frame NF' is centred for each step (16), then $v_I^{n'}(t_2^\kappa) = 0$ m/s $\forall \kappa$.

The steps corresponding to equations (14) to (17) are performed by the second module DET_POS_C for determining the Cartesian position Position_C of the accelerometer A.

In this case, the calculated position may be further subject to drift due to $q_{n'n}(t)$. To limit the drift and correct the path, it is possible to include additional data on the gait characteristics.

Moreover, some characteristics of the path of the ankle are processed. For example, it may be admitted that the path of the ankle is included in a plane (plane movement). Assuming that the plane of the path of the actual step (gait plane) is vertical, then any orientation drift would incline the vertical plane.

Let us assume that the following hypotheses are complied with, corresponding to the predetermined data INF_PRED_TRAJ (i.e. the prior knowledge of the path expressed in the form of predetermined parameters of the path):

the pedestrian is walking on a horizontal floor: $z_I^n(t_1^\kappa) = z_I^n(t_2^\kappa)$; and the gait plane is vertical: $z_{SF}^{n} = z_{NF}^{n} = [0 \ 0 \ 1]^T$.

Figure 4:
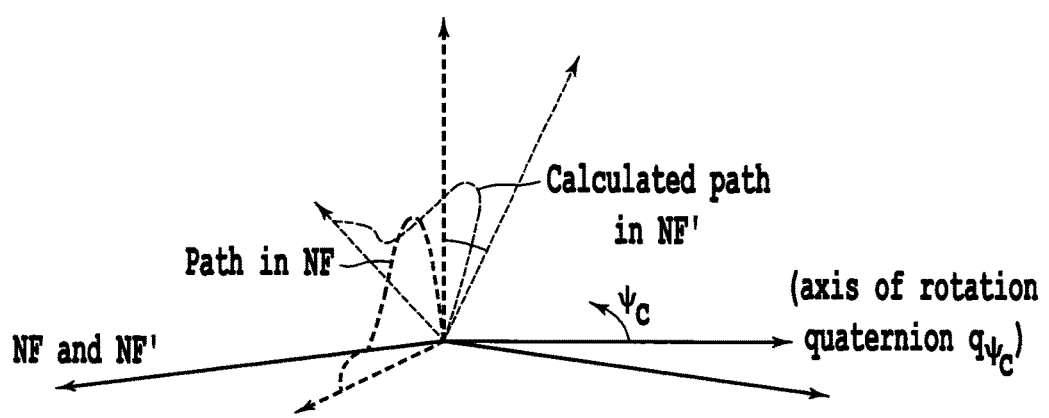
FIG. 4 illustrates the paths in the fixed global frames NF and NF'.

Let $q_{\psi_c}^\kappa$ be the quaternion rotating the path calculated to optimally meet the requirements of the above hypotheses, FIG. 4 illustrates the case of path drift (for a step) and the corresponding path assumed to be the "actual" or "true path". The quaternion $q_{\omega_c}$ is suitable for correcting the path of the step. It thus consists, per se, of applying a rotational realignment model of the path as calculated during steps corresponding to the equations (14) to (17) subject to prior knowledge on the path consisting of the above hypotheses.

If ($e_1^{n'}$, $e_2^{n'}$, $e_3^{n'}$) are considered to be the three vectors correlated with the gait plane for a step in the frame NF', calculated at the end of the step ($t=t_2^\kappa$), this gives the following system:

$$e_1^{n'} = [e_{1,x}^{n'} \ e_{1,y}^{n'} \ e_{1,z}^{n'}]^T = x_{SF}^{n'} \quad (18)$$
$$e_2^{n'} = [e_{2,x}^{n'} \ e_{2,y}^{n'} \ e_{2,z}^{n'}]^T = \frac{p_I^{n'}(t_2^\kappa) - p_I^{n'}(t_1^\kappa)}{\|p_I^{n'}(t_2^\kappa) - p_I^{n'}(t_1^\kappa)\|}$$
$$e_3^{n'} = [e_{3,x}^{n'} \ e_{3,y}^{n'} \ e_{3,z}^{n'}]^T = e_1^{n'} \wedge e_2^{n'}$$

where p represents the Cartesian positions calculated by the double integration of the natural acceleration, $x_{SF}^{n'}$ refers to the axis of rotation which is invariant over time during the step, $p_I^{n'}$ is provided by the system (17) and ^ denotes the vector product.

To comply with the above hypotheses, these vectors expressed in the fixed frame NF may be expressed according to the following system:

$$e_1^n = [e_{1,x}^n \ e_{1,y}^n \ 0]^T$$
$$e_2^n = [e_{2,x}^n \ e_{2,y}^n \ 0]^T$$
$$e_3^n = e_1^n \wedge e_2^n \quad (19)$$

As the "true" heading is unknown, it is not possible to determine the exact value of the heading in the fixed global frame NF. In other words, it is possible to correct the path regardless of the heading, since it is not possible to adjust the heading of the stride. In this instance, the frame NF is considered to have the same stride heading as that in the frame NF'.

This may be expressed as follows:

$$\begin{cases} e_{2,x}^n = \dfrac{e_{2,x}^{n'}}{\sqrt{(e_{2,x}^n)^2 + (e_{2,y}^n)^2}} \\ e_{2,y}^n = \dfrac{e_{2,y}^{n'}}{\sqrt{(e_{2,x}^n)^2 + (e_{2,y}^n)^2}} \end{cases} \quad (20)$$

and $$\begin{cases} e_{1,x}^n = e_{2,y}^n \\ e_{1,y}^n = -e_{2,x}^n \end{cases}$$

The orientation drift may be represented by the rotation matrix $R_c$ or in an equivalent manner, with the quaternion $q_{\psi_c}$. To determine the rotation quaternion $q_{\psi_c}$ or the rotation matrix $R_c$, i.e. to invert the rotational realignment model of the path subject to drift, it is merely necessary to know the value of two non-collinear vectors in the frame NF' and the values thereof in the fixed global frame NF.

Note that the vectors $\{e_1, e_2, e_3\}$ verify the rotation characteristics (scalar product and norm). It is also assumed that these vectors are linearly independent, otherwise the rotation quaternion is not unique. Also, the correction rotation matrix $R_c$ is given by the following equation:

$$R_c = [e_1^n e_2^n e_3^n][e_1^{n'} e_2^{n'} e_3^{n'}]^{-1} \quad (21)$$

Also, $q_{\psi_c}$ may be deduced from $R_c$ by means of conventional inversion calculations of the formula (4).

A further way to calculate $q_{\psi_c}$ is that of determining the axis of rotation $q_c$ and the angle of rotation $\psi_c$ without calculating the rotation matrix. In this case, the following equations are obtained:

$$q_c = \frac{(e_1^n - e_1^{n'}) \wedge (e_2^n - e_2^{n'})}{\|e_1^n - e_1^{n'}\| \|e_2^n - e_2^{n'}\|} \quad (22)$$

and $$\psi_c = \text{sign}(|[q_c \ e_1^n \ e_1^{n'}]|) \text{atan}\left(\frac{\|(e_1^n \wedge q_c) \wedge (e_1^{n'} \wedge q_c)\|}{(e_1^n \wedge q_c) \cdot (e_1^{n'} \wedge q_c)}\right) \quad (23)$$

where (x·y) denotes the scalar product of two vectors, | | consists of the determinant of a square matrix, and ‖ ‖ consists of the Euclidean norm.

The angle given by atan( ) in the equation (23) is defined in the interval [0 π].

In any case, it is noted that the direct calculation of $q_{\psi_c}$ or the determination of the axis of rotation $q_c$ and the angle of rotation $\psi_c$ clearly represent an inversion of the rotational realignment model.

The steps consisting of the equations (18) to (23) are performed by the retroactive correction module COR-R_POS_A.

When a pedestrian is moving indoors, it is frequently possible to assume a horizontal gait (or a fixed inclination corresponding to stairs). In this way, it is possible to rotate the calculated path to obtain a movement with a predefined inclination, for example horizontal. In this scenario, in addition to the hypothesis in respect of horizontal movement, an ankle path substantially in a vertical movement plane is applied.

In addition to these hypotheses, two hypotheses on the progression of the drift of the frame NF' in relation to the frame NF are possible.

The first assumes that $q_{n'n}(t)$ is invariant over time for short durations, more specifically during the swing phase of each step. In this way, for each step, the frame NF' is assumed to be correlated with the fixed global frame NF by a constant rotation. If $q_{n'n}(t)$ is invariant over time for $t \in [t_1^\kappa, t_2^\kappa]$, then the quaternion $q_{\psi_c}{}^\kappa = q_{nn'}{}^\kappa$ is determined for each step.

The path is then recalculated with a correction applied step by step as explained in the following system:

$$\tilde{a}_l^n(t) = R_c^\kappa a_l^{n'}(t_1^\kappa) \text{ for } t \in [t_1^\kappa, t_2^\kappa] \quad (24)$$

$$\tilde{v}_l^n(t) = \tilde{v}_l^n(t_1^\kappa) + \int_{t_1^\kappa}^{t} \tilde{a}_p^n(t)dt = R_c^\kappa \tilde{v}_l^{n'}(t)$$

$$\tilde{p}_l^n(t) = \tilde{p}_l^n(t_2^{\kappa-1}) + \int_{t_1^\kappa}^{t} \tilde{v}_l^n(t)dt$$

wherein $R_c^\kappa$ is the correction rotation matrix associated with the $\kappa^{th}$ step.

However, the frame NF' drifts continually over time and even during the foot swing phase.

Figure 5:
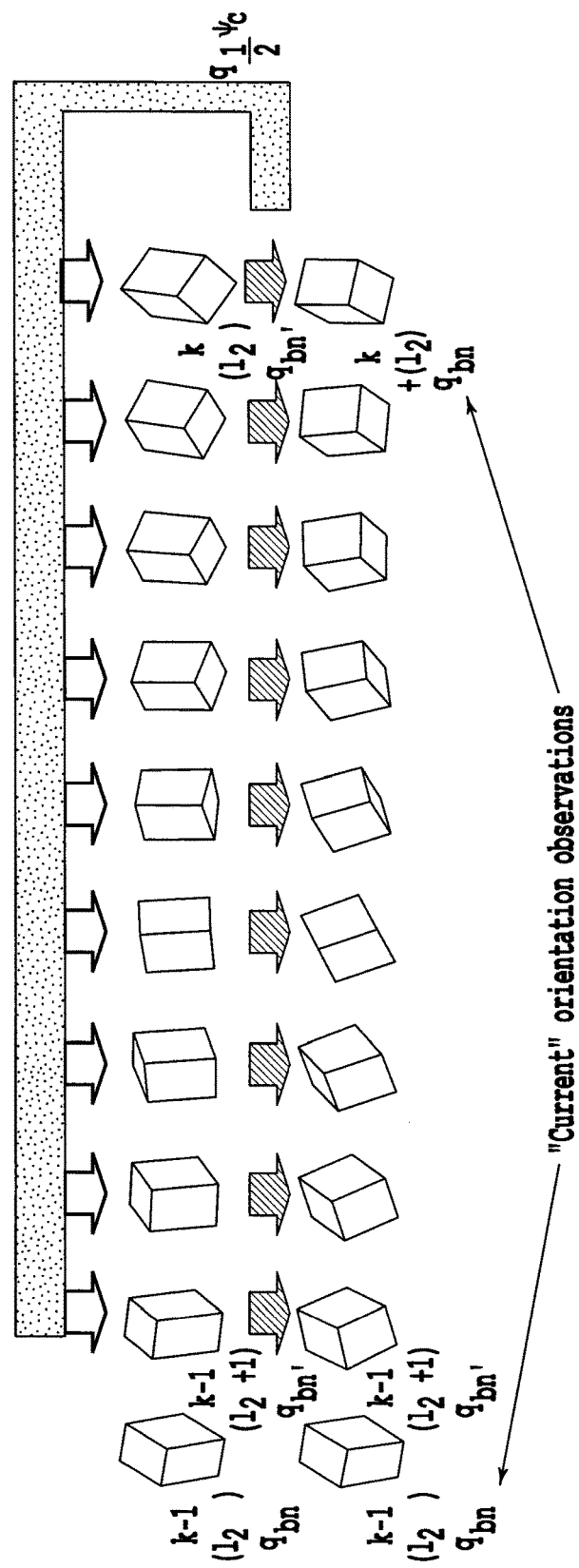
FIG. 5 illustrates the retroactive correction of the orientation or angular position.

It is assumed that the error in the orientation or angular position is due to the integration of bias from the measurements of the gyrometer G over time. In this way, the integration of a constant bias induces linear drift of the orientation. Consequently, it is convenient not only to correct the final orientation, but to reinject and distribute the correction along the path as illustrated in FIG. 5.

If the frame NF' drifts due to constant bias of the gyrometer G, then the angle of rotation given by $q_{n'n}$ increases linearly over time. If the bias of the gyrometer G varies slowly over time, then the drifts of the angle of rotation $q_{n'n}$ may still be considered to be linear for a short period (for example, during the foot swing phase).

As shown in FIG. 1, two further steps in relation to the prior may be added:
  a first step calculates the orientation of the correction quaternion $q_{\psi_c}$;
  a second step determines the corrected quaternions $q_{bn}{}^+(t)$ by means of a correction, increasing in a linear fashion, of the set of orientation quaternions $q_{bn}(t)$ determining the orientation of the frame NF' in the local frame BF, starting with the last temporal index of the previously corrected step $t \in [t_2^{\kappa-1}, t_2^\kappa]$. Subsequently, $q_{bn}{}^+(t)$ is calculated and the path of the ankle is recalculated. Finally, a loop is proposed for enhancing the calculation of $q_{bn}{}^+(t)$ and such that the path of the ankle verifies the above constraints.

More specifically, the equations used to estimate the corrected path are given. Let $q^{+(0)} = q_{bn}{}^{(0)}$ be the quaternion of the last known "true" orientation, at the end of the previous step. L angular velocity samples are then integrated before observing the position at the end of the present step, wherein the associated quaternion is referenced $q_{bn}{}^{+(L)}$.

Without a correction command, the orientation $q_{bn'}{}^{(l)}$ calculated on the basis of the integration of the gyrometer measurements drifts over time.

One aim of the invention is that of calculating the corrected orientation $q_{bn}{}^{+(l)}$ by applying a correction $$q_{-\frac{l}{L}\psi_c}$$

varying in a linear fashion over time (in this instance, the correction increases in a linear fashion over time), so as to compensate for the drift of $q_{bn}{}^{(l)}$ by applying the following equation:

$$q_{bn}^{+(l)} = q_{bn'}^{(l)} \otimes q_{-\frac{l}{L}\psi_c} \quad (25)$$

for $$l \in \{l_2^{\kappa-1} : l_2^\kappa\}$$

wherein:

$$q_{bn'}^{(l)} = q_{-\omega}^{(l-1)} \otimes \ldots \otimes q_{-\omega}^{b(l_2^{\kappa-1}+1)} \otimes q^{+(l_2^{\kappa-1})} \quad (26)$$

$$q_{-\frac{l}{L}\psi_c} = \left[\cos\left(\frac{l}{L}\psi_c/2\right) - \sin\left(\frac{l}{L}\psi_c/2\right)q_c\right]^T$$

In the equation (25), $q_{bn}{}^+$ is corrected in a linear fashion, so as to obtain a continuous correction of the orientation at the start of the step $q_{bn}^+(0)=q_0$ to the orientation at the end of the step $q_{bn}^+(L)=q_{\psi_c} \otimes q_{bn'}^{(L)}$, which is equivalent to $q_{bn}^+(L)=q_{bn'}^{(L)} \otimes q_{-\psi_c}$.

The path is recalculated on the basis of the corrected orientation $q_{bn}^+$. For this purpose, the following system is first calculated:

$$\breve{a}^n(t) = R_{nb}^+(t) a^b(t)$$

$$\breve{a}_p^n(t) = \breve{a}^n(t) + \breve{g}^n \quad (27)$$

wherein the variable ă (or ğ) represents the quantity a (or g) calculated on the basis of the hypothesis whereby the drift increases in a linear fashion and thus on the linear correction.

The matrix $R_{nb}^{+(l)}$ is obtained using $q_{nb}^{+(l)}$ as in the equation (4), and this gives the following equation:

$$\breve{g}^n = -\frac{1}{t_2^\kappa - t_1^\kappa} \int_{t=t_1^\kappa}^{t} \breve{a}^n(t) \quad (28)$$

Also, the velocity and position of the sensor assembly EC are calculated using the following system:

$$\breve{v}_I^n(t) = \breve{v}_I^n(t_1^\kappa) + \int_{t_1^\kappa}^{t} \breve{a}_p^n(t) dt \quad (29)$$

$$\breve{p}_I^n(t) = \breve{p}_I^n(t_2^{\kappa-1}) + \int_{t_1^\kappa}^{t} \breve{v}_I^n(t) dt$$

Once the path of the ankle has been calculated, it is possible to recalculate, in a further loop, a further correction quaternion $q_{\psi_c}$ based on the latter path of the ankle. A further loop is then run to calculate a further quaternion $q_{bn}^+$ and a further position $\breve{p}_I^n$.

It can be noted that in equation (25), $q_{bn}^{+(l)}$ may be expressed recursively as a function of $q_{bn}^{+(l-1)}$ according to the following equation:

$$q_{bn}^{+(l)} = q_{-\omega^+}^{b(l-1)} \otimes q_{bn}^{+(l-1)} \quad (30)$$

wherein $q_{-\omega^+}^{b(l)}$ denotes the corrected angular velocity quaternion and is defined by the following equation:

$$q_{-\omega^+}^{b(l)} = q_{-\omega}^{b(l)} \otimes q_{-\frac{1}{L}\psi_c}^{+(l)} = q_{-\omega}^{b(l)} \otimes \left( q_{bn'}^{+(l)} \otimes q_{-\frac{1}{L}\psi_c} \otimes q_{n'b}^{(l)} \right) \quad (31)$$

wherein the correction is equidistributed, the equation (31) being obtained using the following equation:

$$q_{bn}^{+(l)} = q_{bn'}^{(l)} \otimes q_{-\frac{l}{L}\psi_c} \quad (32)$$

$$= [q_{-\omega}^{b(l-1)} \otimes q_{bn'}^{(l-1)}] \otimes \left[ q_{-\frac{1}{L}\psi_c} \otimes q_{-\frac{l-1}{L}\psi_c} \right]$$

$$= [q_{-\omega}^{b(l-1)} \otimes q_{bn'}^{(l-1)}] \otimes \left[ q_{-\frac{1}{L}\psi_c} \otimes (q_{n'b}^{(l-1)} \otimes q_{bn'}^{(l-1)}) \otimes q_{-\frac{l-1}{L}\psi_c} \right]$$

$$= q_{-\omega}^{b(l-1)} \otimes \left( q_{bn'}^{(l-1)} \otimes q_{-\frac{1}{L}\psi_c} \otimes q_{n'b}^{(l-1)} \right) \otimes q_{bn}^{+(l-1)}$$

$$= q_{-\omega^+}^{b(l-1)} \otimes q_{bn}^{+(l-1)}$$

The proposed invention is tested and compared to a different conventional approach using identical experimental data. A pedestrian equipped with a sensor assembly 3A3G, denoting a triaxial accelerometer and triaxial gyrometer, mounted on the user's ankle, walks inside a building where the floor is assumed to be plane and horizontal, wherein the gait plane is assumed to be vertical.

FIGS. 7a, 7b, and 7c represent the three-dimensional or 3D path of the pedestrian's ankle. In FIG. 7a, no correction is made, in FIG. 7b, the correction is made with the first hypothesis in respect of a constant angle between NF and NF' (using the equation (24) and preceding equations) and in FIG. 7c, the correction is made with the second hypothesis in respect of linear variation of the angle between NF and NF'. Unlike the calculated path without correction, which drifts as shown in FIG. 7a, it is clear that the proposed corrections comply with the constraints, as illustrated in FIGS. 7b and 7c.

As explained above, the correction quaternion $q_{\omega_c}$ is not able to correct the drift in position. The term $\tilde{v}$ denotes the horizontal velocity, and $\tilde{\varphi}_b$ the biased direction of movement in relation to the North given using the first hypothesis (i.e. invariant orientation drift over time). The term $\breve{v}$ denotes the horizontal velocity and $\breve{\varphi}_b$ the direction of movement in relation to the North given using the second hypothesis (i.e. linear orientation drift over time).

This gives the following equations:

$$\tilde{v} = \sqrt{(\tilde{v}_{l,x}^n)^2 + (\tilde{v}_{l,y}^n)^2} \quad (33)$$

$$\tilde{\varphi}_b = \operatorname{atan}\left(\frac{\tilde{v}_{l,y}^n}{\tilde{v}_{l,y}^n}\right)$$

and $$\breve{v} = \sqrt{(\breve{v}_{l,x}^n)^2 + (\breve{v}_{l,y}^n)^2} \quad (34)$$

$$\breve{\varphi}_b = \operatorname{atan}\left(\frac{\breve{v}_{l,y}^n}{\breve{v}_{l,y}^n}\right)$$

$\tilde{v}_l^n = [\tilde{v}_{l,x}^n \, \tilde{v}_{l,y}^n \, \tilde{v}_{l,z}^n]^T$ and $\breve{v}_l^n = [\breve{v}_{l,x}^n \, \breve{v}_{l,y}^n \, \breve{v}_{l,z}^n]^T$ are given in the equations (24) and (29), respectively.

FIGS. 8a and 8b respectively show the same paths as those in FIGS. 6b and 6c in the horizontal plane. In this instance, the directions of movement in relation to the North $\tilde{\varphi}_b$ and $\breve{\varphi}_b$ are biased, but it can be observed on $\breve{\varphi}_b$ that the orientation correction with the second hypotheses clearly reduces this drift $\breve{\varphi}_b$.

The invention claimed is:

1. A method for applying and determining a path of a moving element or body using a sensor assembly, wherein the sensor assembly is mounted on the moving element or body and includes an accelerometer and a gyrometer which are rigidly connected, the method comprising:
receiving acceleration values provided by the accelerometer and measured for at least two times from a plurality of successive times of a time interval;
receiving angular velocity values provided by the gyrometer and measured for at least two times from the plurality of successive times of the time interval;
estimating at least one angular position value using the angular velocity values provided by gyrometer;
calculating at least two Cartesian position values defining a path of the moving element or body in a reference frame fixed to the Earth's frame of reference, using the acceleration values provided by the accelerometer and the at least one angular position value, wherein the at least one angular position value is used to convert the acceleration values provided by the accelerometer to the reference frame, fixed to the Earth's frame of reference, and wherein the two Cartesian position values are calculated using a double integration calculation made on the converted acceleration values;

using the two calculated Cartesian position values, estimating rotation parameters by inverting a rotational realignment model of the calculated path with a constraint of prior knowledge of the path, wherein the prior knowledge of the path includes predetermined parameters of the path;

retroactively correcting the at least one angular position value by applying a rotation on the at least one angular position value using the estimated rotation parameters, to provide at least one corrected angular position value;

repeating the calculating step to determine the path of the moving element or body using the at least one corrected angular position value instead of the at least one angular position value; and tracking the moving element or body from the determined path of the moving element or body.

2. The method for applying and determining a path according to claim 1, wherein the retroactive correcting further comprises a retroactive correction of the at least two Cartesian position values using the acceleration values provided by the accelerometer and the at least one corrected angular position value.

3. The method for applying and determining a path according to claim 1, wherein:
the acceleration values provided by the accelerometer and the angular velocity values provided by the gyrometer are expressed in a moving frame associated with the sensor assembly, and
the estimation of the at least one angular position value is expressed in a form of rotational angle parameters in relation to axes of a fixed global frame linked with the Earth's frame and the calculation of the at least two Cartesian position values is expressed in a form of Cartesian coordinates in the same fixed global frame.

4. The method for applying and determining a path according to claim 1, wherein the retroactive correction is performed in a plurality of iterations, for an iterative correction of the at least one angular position value.

5. The method for applying and determining a path according to claim 1, wherein the rotation parameters are those of a quaternion.

6. The method for applying and determining a path according to claim 1, wherein the prior knowledge of the path includes angular orientation parameters of a plane considered to contain the path.

7. The method for applying and determining a path according to claim 1, wherein the prior knowledge of the path includes Cartesian coordinates of at least two points considered to be part of the path.

8. The method for applying and determining a path according to claim 1, wherein the prior knowledge of the path includes heading or slope parameters of the path.

9. The method for applying and determining a path according to claim 1, wherein the retroactive correcting is devised so that the correction made using the estimated rotation parameters is distributed in a predetermined manner over all or part of the plurality of successive times of the time interval.

10. The method for applying and determining a path according to claim 9, wherein the predetermined distribution of the retroactive correction is defined so as to increase, in a linear fashion, correction parameters calculated using the estimated rotation parameters over all or part of the plurality of successive times of the time interval.

11. A non-transitory computer-readable medium including computer executable instructions executable by a computer, comprising instructions for executing the method for applying and determining a path according to claim 1, when executed on a computer.

12. The method for applying and determining a path according to claim 6, wherein the angular orientation parameters of the plane considered to contain the path are expressed in relation to vertical and/or North.

13. The method for applying and determining a path according to claim 1, wherein the moving element or body is a mobile terminal.

14. A system for applying and determining a path of a moving element or body, comprising:
an accelerometer configured to provide acceleration values measured at successive times of a given time interval;
a gyrometer rigidly connected to the accelerometer, configured to provide angular velocity values measured at successive times of the time interval; and
circuitry configured to
receive acceleration values provided by the accelerometer and measured for at least two times from a plurality of successive times of a time interval,
receive angular velocity values provided by the gyrometer and measured for at least two times from the plurality of successive times of the time interval,
estimate at least one angular position value using the angular velocity values provided by the gyrometer,
calculate at least two Cartesian position values defining a path of the moving element or body in a reference frame fixed to the Earth's frame of reference, using the acceleration values provided by the accelerometer and the at least one angular position value, wherein the at least one angular position value is used to convert the acceleration values provided by the accelerometer to the reference frame, fixed to the Earth's frame of reference, and wherein the two Cartesian position values are calculated using a double integration calculation made on the converted acceleration values,
using the two calculated Cartesian position values, estimate rotation parameters by inverting a rotational realignment model of the calculated path with a constraint of prior knowledge of the path, wherein the prior knowledge of the path includes predetermined parameters of the path,
retroactively correct the at least one angular position value by applying a rotation on the at least one angular position value using the estimated rotation parameters, to provide at least one corrected angular position value,
repeat the calculating to determine the path of the moving element or body using the at least one corrected angular position value instead of the at least one angular position value, and
track the moving element or body from the determined path of the moving element or body.

15. The system for applying and determining a path according to claim 14, further comprising means for rigidly mounting the accelerometer and the gyrometer on a user, or on a user's ankle, or on a mobile terminal, or on a land, air, or sea vehicle.

* * * * *